(12) United States Patent
Andre (10) Patent No.: US 10,946,909 B2
(45) Date of Patent: Mar. 16, 2021

(54) RETRACTABLE AERODYNAMIC SYSTEM FOR A MOTOR VEHICLE

(71) Applicant: Compagnie Plastic Omnium, Lyons (FR)

(72) Inventor: Gérald Andre, Saint Denis en Bugey (FR)

(73) Assignee: Compagnie Plastic Omnium, Lyons (FR)

( * ) Notice: Subject to any disclaimer, the term of this patent is extended or adjusted under 35 U.S.C. 154(b) by 112 days.

(21) Appl. No.: 16/473,159

(22) PCT Filed: Nov. 15, 2017

(86) PCT No.: PCT/FR2017/053595
§ 371 (c)(1),
(2) Date: Jun. 24, 2019

(87) PCT Pub. No.: WO2018/115652
PCT Pub. Date: Jun. 28, 2018

(65) Prior Publication Data
US 2019/0322323 A1 Oct. 24, 2019

(30) Foreign Application Priority Data
Dec. 22, 2016 (FR) ...................... 16 63211

(51) Int. Cl.
*B62D 35/00* (2006.01)
*G05G 5/06* (2006.01)

(52) U.S. Cl.
CPC ............. *B62D 35/005* (2013.01); *G05G 5/06* (2013.01)

(58) Field of Classification Search
CPC ........ B62D 35/005; B62D 37/02; G05G 5/06; Y02T 10/82
(Continued)

(56) References Cited

U.S. PATENT DOCUMENTS 4,489,806 A * 12/1984 Shimomura ......... B62D 35/005
180/313
6,644,700 B2 * 11/2003 Ito ........................... B60R 19/48
293/117
(Continued)

FOREIGN PATENT DOCUMENTS

FR 2821593 A1 9/2002
FR 2864811 A1 7/2005
(Continued)

OTHER PUBLICATIONS

International Search Report Application No. PCT/FR2017/053595 dated Mar. 26, 2018 2 pages.

*Primary Examiner* — Pinel E Romain
(74) *Attorney, Agent, or Firm* — St. Onge Steward Johnston & Reens, LLC (57) ABSTRACT

The invention provides a retractable aerodynamic system for a motor vehicle including a structure of the vehicle. The system includes at least one aerodynamic flap, a drive mechanism that can rotate the aerodynamic flap about a rotation axis, and at least one member for locking the aerodynamic flap in at least one indexed position with respect to the structure of the vehicle. The locking member is able to transmit forces experienced by the aerodynamic flap to the structure of the vehicle when the aerodynamic flap is locked in the indexed position.

19 Claims, 3 Drawing Sheets

(58) Field of Classification Search
USPC .................................................... 296/180.1
See application file for complete search history.

(56) References Cited

U.S. PATENT DOCUMENTS

| | | | | |
|---|---|---|---|---|
| 6,742,831 B2* | 6/2004 | Rees | .................... | B62D 35/007 |
| | | | | 296/180.1 |
| 7,055,891 B2* | 6/2006 | Jungert | ................ | B62D 35/005 |
| | | | | 296/180.5 |
| 8,430,447 B2* | 4/2013 | Jungert | ................ | B62D 35/005 |
| | | | | 296/180.1 |
| 8,562,067 B2* | 10/2013 | Hoelzel | ................ | B62D 35/005 |
| | | | | 296/180.5 |
| 8,702,152 B1* | 4/2014 | Platto | .................... | B62D 37/02 |
| | | | | 296/180.1 |
| 2017/0158259 A1* | 6/2017 | Fahland | ................ | B62D 37/02 |

FOREIGN PATENT DOCUMENTS

| | | | |
|---|---|---|---|
| FR | 2927303 | A1 | 8/2009 |
| FR | 3031150 | A1 | 7/2016 |
| WO | 2015059377 | A1 | 4/2015 |
| WO | 2016102881 | A1 | 6/2016 |

\* cited by examiner

RETRACTABLE AERODYNAMIC SYSTEM FOR A MOTOR VEHICLE

FIELD OF THE INVENTION

This invention relates to the field of motor vehicles. In particular, the invention relates to a retractable aerodynamic system, intended to be mounted on a motor vehicle.

BACKGROUND OF THE INVENTION

Vehicles comprising mobile elements integrated under the front bumper of the vehicle are described for example in French Patent FR2821593, FR2927303 and FR2864811.

Such retractable flaps are designed to improve the vehicle aerodynamics, for example by reducing the vehicle drag and consumption, especially at speeds greater than 70 km/h. These flaps can be placed at various positions on the bodywork: front, sides and/or rear.

Such flaps are especially useful under vehicles with high ground clearance such as 4-wheel drive vehicles, SUVs and MPVs. These vehicles, in fact, consume more fuel, especially due to a ground clearance involving high aerodynamic losses.

These retractable aerodynamic flaps can simply be mounted on a shaft and rotated on this shaft by a drive means comprising an electric motor. Whether the motor of the drive means is of type irreversible or reversible geared motor, the flaps are generally connected directly with the geared motor which rotated by a worm screw coupled to a gear, both coupled to the rotor of the electric motor.

The purpose of an aerodynamic flap is to limit the flow of air under the vehicle. To do this, it has a large surface area (0.1 to 0.2 $m^2$) which implies that the flap experiences, when in the open position and at high speed, high forces (that can generate a torque of approximately 15 to 20 Nm). The forces are transmitted to its rotation axis, which results directly in a high stress on the worm screw and the gear. Moreover, in most cases, the motor gear is made of plastic. There is therefore a significant risk of creep with this type of gear, possibly even damage to its teeth, especially due to fatigue.

In addition, the flap may also be subjected to so-called exceptional forces, for example strong wind, impact at high speed or manual forces.

To remedy this problem, patent application FR3031150, filed in the name of the applicant, proposed a disengagement member to disconnect the drive means and the shaft. This solution, while protecting the drive means and its components against the forces mentioned, implies freedom of rotation between the shaft carrying the flap and the drive means.

In addition, the flap is also subjected to environmental stresses such as aerodynamic turbulence and vibrations of the vehicle, in addition to the aerodynamic load. These cause vibrations in the gear and tend to rotate the worm screw and therefore the flap. As a result, the flap no longer performs its aerodynamic function optimally.

To compensate for all the forces transmitted by the flap to the drive means in normal driving situation, without having to disengage the connection between the drive means and the shaft rotated, the possibility of applying a permanent force by the drive means to compensate for the small rotations which may occur has already been considered. However, this solution has the disadvantage of having to supply the drive means permanently with energy and does not solve the problem of stress and fatigue on the gear teeth.

Another solution consists in temporarily starting the drive means when a shift is observed. Nevertheless, with this solution, the drive means must be equipped with a rotary sensor (usually a system with a magnet and a Hall effect sensor) and an electronic system capable of processing the information transmitted continuously by the sensor. This solution is therefore more complex to implement and generates an extra cost, making it unattractive to car manufacturers.

SUMMARY OF THE INVENTION

The invention aims to remedy these disadvantages by providing an aerodynamic system which is relatively unrestricting for the drive means, whether irreversible or not, and its components, such as the worm screw and the gear, easy to implement on vehicles and attractive to car manufacturers.

Thus, the invention provides a retractable aerodynamic system for a motor vehicle comprising a structure of the vehicle, at least one aerodynamic flap, a drive means that can rotate the aerodynamic flap about a rotation axis, and at least one member for locking the aerodynamic flap in an indexed position with respect to the structure of the vehicle, the locking member being able to transmit forces experienced by the aerodynamic flap to the structure of the vehicle when the aerodynamic flap is locked in the indexed position.

The drive means can be any means known by those skilled in the art capable of rotating the flap about the rotation axis. Such drive means may be an assembly consisting of a reducer and an electric motor, assembly also called a geared motor.

The structure of the vehicle represents the highly rigid components forming the frame of the vehicle to which the inner and outer equipment of the bodywork is attached. This structure consists mainly of the body in white.

Thus, after a rotation about the rotation axis, induced by the drive means, which pivoted the aerodynamic flat through a certain angle, until it is in a desired position, for example the open position in which the vehicle aerodynamics are optimum, the locking member of the system according to the invention both locks the flap in this position and transmits a large proportion of the forces experienced by the flap to the structure of the vehicle, thereby considerably reducing the stress on the drive means. Such forces can be vibratory forces and force peaks of short duration, which may correspond to impacts on the aerodynamic flap which do not rotate the flap sufficiently to force it to leave its indexed position. Consequently, the drive means can be deactivated once the indexed position has been reached, with reduced or even zero risk of damaging its components due to the forces experienced by the flap, for a permanent aerodynamic load (for reversible type motors) and for occasional or periodic forces (for irreversible type motors).

Advantageously, the locking member is able to transmit the forces experienced to lock the aerodynamic flap without any force exerted by the drive means.

Thus, such a system provides better protection of the drive means against the forces experienced by the flap locked in the indexed position. By extension, the motor components are also better protected in this advantageous alternative of the invention.

Advantageously, the locking member comprises at least one assembly consisting of a spring element and a housing arranged to accommodate at least a portion of the spring element, the housing and the spring element being arranged to be assembled to one another with little clearance, preferably with zero clearance.

Thus, the locking member has a damping effect due to its one or more spring elements. Such an effect filters the forces experienced by the flap which are transmitted, by the locking member, to the structure of the vehicle. Consequently, the flap is no longer rigidly connected to the structure of the vehicle, which protects the rotation axis and the connecting elements. In addition, the assembly between the housing and the spring element locks the flap in the indexed position more securely. Once the indexed position has been reached in fact, by rotating a cylindrical area of the system on which the housing is located, the spring element can forcibly enter the housing and securely lock the flap position. Consequently, the risks of unlocking the flap position, which would cause stresses on the worm screw and the gear of the motor, are reduced even further. The freedom of rotation of the flap when it is locked in the indexed position is minimised. Consequently, the stresses induced by such freedom of rotation and which are transmitted to the rest of the system are also minimised, which preserves the robustness of the system components even further.

Advantageously, the clearance between the housing and the spring element is less than all the clearances present in the rest of the system.

In this description, "all the clearances present in the rest of the system" means the other rotation clearances present in the system, such as the rotation clearances present in the drive means, for example the clearances between the motor components (worm screw, gear, etc.).

Thus, all the stresses resulting from the aerodynamic forces are transmitted at the connection between the housing and the spring element due to the clearance which is lower than any other clearance characterising other connections of the system, in particular the connections at the drive means. These connections, which have greater clearances, are therefore unaffected by the stresses resulting from the aerodynamic forces experienced by the flap.

Advantageously, the housing comprises a cavity. Preferably, this cavity has a concave shape with a depth of 2 to 5 mm.

Thus, it is easy to give the portion of the spring element a shape which is complementary to that of the housing, for example convex. It is therefore easier to ensure that there is no clearance between the member with the housing and the spring element, when rotating the flap about the rotation axis, while providing a small angle of rotation before the spring element moves out. This therefore allows the indexed position to be unlocked when such unlocking is required, for example, under the action of an excessive external force applied on the flap or, conversely under the action of the drive means, when the vehicle speed is low and the flap no longer needs to be unfolded. Cumulatively, it is possible to plan a radial displacement of the spring element of between 2 and 5 mm, in other words a displacement from the centre of the member with the housing towards the outside of this member, to disengage the spring element and the housing.

Advantageously, the spring element is arranged to disengage from the housing when a torque exerted about the rotation axis is greater than a predetermined threshold, preferably 50% of the maximum forces experienced by the aerodynamic flap (4) when driving.

Thus, as mentioned in the previous paragraph, the spring element can have a portion of convex shape complementary to the concave shape of the housing so that they can be assembled together with no clearance. Preferably, the coefficient of friction between the material of the housing and that of the spring element is low, about 0.1. Therefore, due to the virtually zero clearance and the low coefficient of friction between the housing and the spring element, the torque required to compress the spring element sufficiently for it to come out of the housing can now be predicted with high accuracy. Consequently, when the aerodynamic flap needs to leave its indexed position, the vehicle electronics can activate the drive means so that it induces sufficient torque about the rotation axis to force the spring element out of the housing. This torque greater than the threshold may also be due to excessive aerodynamic forces experienced by the flap during exceptional situations, such as small impacts or a strong wind. Thus, it is possible to protect the flap which pivots up to a position where it is less subjected to these forces, preferably up to the folded position.

Advantageously, the system according to the invention further comprises a disengagement member for disengaging a connection between the drive means and the aerodynamic flap.

Such a disengagement member is particularly advantageous when using an irreversible type motor, in other words a motor comprising for example a worm screw with low helix angle which cannot be rotated by a rotation occasionally forced by the flap. This disengagement member can, for example, comprise two elements adapted to engage into one another in a direction substantially parallel to the rotation axis, one of these elements being connected to the drive means and the other to the aerodynamic flap. As described in application FR3031150, the first element may comprise a recess at the engagement interface of these two elements, such a recess being able to accommodate an elastic means of the second element when necessary and thus secure in rotation the two elements, and by extension the drive means and the aerodynamic flap, to one another.

Thus, with such a disengagement member, used in combination with the locking member, a system can be provided for interrupting the connection between the drive means and the flap and, consequently, also interrupting the transmission to the drive means of the forces experienced by the flap, in order to protect the motor and its components against premature wear or damage caused by these forces.

Advantageously, the housing or at least one of the housings of the locking member is located on the aerodynamic flap.

The housing can therefore be positioned farther away from the rotation axis, which means that less force is required by the spring to produce the same locking torque.

Thus, it is possible to plan one or more housings over the length of the flap so as to optimise the locking of the flap in the one or more indexed positions, when manufacturing the flap. In addition, in this case the housing does not have to be located directly on the circular area representing the rotation axis, but may be located farther away on the aerodynamic flap, which means that a smaller angular displacement of the spring element is sufficient to engage it in and disengage it from the housing. In addition, the locking point, formed by the assembly consisting of the spring element and the housing, does not have to be located right beside the drive means, which means that the locking member and the drive means can contribute to withstanding the aerodynamic forces.

Advantageously, the housing or at least one of the housings is far away from the drive means, the housing preferably being located near the centre of thrust of the flap.

Thus, such positioning balances the torsional effects which apply over the entire rotation axis. Such a position of the housing can be the centre of thrust of the flap which corresponds to the area of the flap giving the best balanced distribution of the torsional forces in the flap. Using the locking member, it would therefore be possible to have a more flexible flap although the actuator is located at one of its ends. Such a position results in optimal limitation of the maximum deflection of the flap. The housing can also be positioned as far away as possible from the drive means. Consequently, such a position, which implies greater deflection of the flap, offers the possibility of pre-stressing the flap with the drive means when the locking is engaged, in order to compensate for the clearances and the flexibility of the flap. The drive means and the locking member therefore contribute equally to withstanding the aerodynamic forces.

In an alternative of this embodiment, the housing or at least one of the housings is located near the drive means.

Thus, the drive means needs to exert less torque to separate the spring element and the housing, since there is no damping of the forces induced by the drive means up to the housing, combined with the effect of the geographical proximity of the housing with respect to the drive means, which makes the torque transmission more rigid. Consequently, this optimises the operation of the system when the drive means rotates the flap, since the drive means only supplies the torque required to separate the locking member.

Advantageously, the system comprises at least two housings whose cavities have different depths.

Thus, it is possible to lock, within the same system, two indexed rotation positions with different locking levels. The spring element goes in fact further into the deeper housing which, for two housings of identical shape, makes it more difficult for the spring element to come out than if it was assembled in the other housing. Consequently, the indexed position related to the locking point with the deeper housing is more secure. For example, the more secure position can be the open position of the flap and the second position can be the closed position. Such a combination can be considered in particular if the drive means used for actuation comprises a reversible type motor. In this case in fact, the flap must be permanently held by the locking member when the drive means is not supplied with energy to prevent the drive means from turning, driven for example by the weight of the flap in the closed position when the vehicle experiences vertical accelerations when driving.

Advantageously, at least two housings are arranged in the system in order to lock the same indexed position.

Thus, it is possible to combine the locking forces of several locking points. The housing specific to each locking point are therefore distributed along the rotation axis of the system in order to lock the same flap inclination angle. Obviously, with such an alternative, the system requires at least one spring element for each housing planned to lock the same flap inclination angle, each of these spring elements being adapted to simultaneously enter one of the housings. These spring elements can be present in the same locking member or in different locking members.

Advantageously, the system comprises several series of housings arranged along the rotation axis, on the flap and/or on an area of the rotation axis separate from the flap, in order to cover all the flap inclination angles advantageous to optimise the aerodynamics of different motor vehicles. The one or more spring elements now simply have to be positioned so that they go into the correct housing, depending on the type of vehicle and the angle(s) used for this vehicle. Consequently, such a system can be implemented on any type of vehicle, which represents a substantial advantage for the manufacturer.

Advantageously, the system comprises means for connecting the aerodynamic flap to the structure of the vehicle, the connecting means being arranged to allow the aerodynamic flap to rotate about the rotation axis and in which the spring element is attached to the connecting means.

Thus, transmission of the forces from the locking member to the structure of the vehicle induces less risk of clearance, since the deformations are limited by the connecting means. In addition, a part of these means can be arranged to act as support for the circular area representing the rotation axis and partially surround this area. This part, which can be called a friction ring, is used to secure the positioning of the rotation axis and therefore ensure correct rotation of the flap about the rotation axis.

Advantageously, the locking member, the rotation axis, and/or the connecting means are made of stainless steel, treated steel or low-friction plastic, such as polyoxymethylene (POM) or polyamide PA66.

Thus, when the spring element of the locking member is outside one of the housings and is therefore compressed, it only exerts a low force against the rotation of the aerodynamic flap. This low force is in fact limited to the reduced friction of the contact surface between the spring element and the member with the housing, in other words either the rotation axis or the aerodynamic flap itself. The same applies for the frictional forces between the friction ring of the connecting means and the rotation axis, in other words either the rotation axis or the aerodynamic flap itself, which are also reduced in this advantageous alternative of the invention.

Advantageously, the indexed position of the flap is a position in which the aerodynamic flap makes an angle of at least 40° relative to the aerodynamic flap in the closed position, preferably an angle between 40° and 90°.

Thus, it is possible to lock the open position of the flap which represents the best aerodynamic position of the vehicle but which is also the position for which the stresses experienced and transmitted by the flap are generally the largest. Consequently, locking such a position of the flap ensures optimum aerodynamics of the vehicle while protecting the motor and its components from any damage due to aerodynamic stresses experienced and transmitted by the flap.

In order to describe the invention, a transmission of forces by a drive means on a rotation axis is taken as a reference, the drive means being located at one end of the rotation axis. Obviously, the invention is not limited to this single arrangement. The drive means, generally called actuator, can be positioned differently along the rotation axis. The forces can also be transmitted by other means, such as a connecting rod for example. These alternative embodiments do not affect in any way the correct operation of the retractable aerodynamic system of the invention.

BRIEF DESCRIPTION OF THE DRAWINGS

The invention will be better understood on reading the accompanying figures, which are given solely by way of example and not limiting in any way, in which.

DETAILED DESCRIPTION OF THE INVENTION

A retractable aerodynamic system 1 for a motor vehicle 70 comprising a structure of the vehicle 7 will now be described in detail. This system 1 comprises at least one aerodynamic flap 4, a motor 2 that can rotate the aerodynamic flap 4 about a rotation axis 3, and at least one member 5 for locking the aerodynamic flap 4 in at least one indexed position with respect to the structure of the vehicle 7, the locking member 5 being able to transmit forces experienced by the aerodynamic flap 4 to the structure of the vehicle 7 when the aerodynamic flap 4 is locked in the indexed position.

We will describe a particular embodiment using FIGS. 1 to 6, in which the rotation axis 3 consists of a rotation shaft 3, for example a bar or tube of circular cross-section and in which the drive means consists only of an electric motor 2. The invention is not limited to this type of embodiment, the rotation axis may, for example, consist of two half shafts or of a portion of the aerodynamic flap when the rotation axis and the flap form a single part. The drive means may be an assembly consisting of a reducer and an electric motor.

Figures 1, 2:
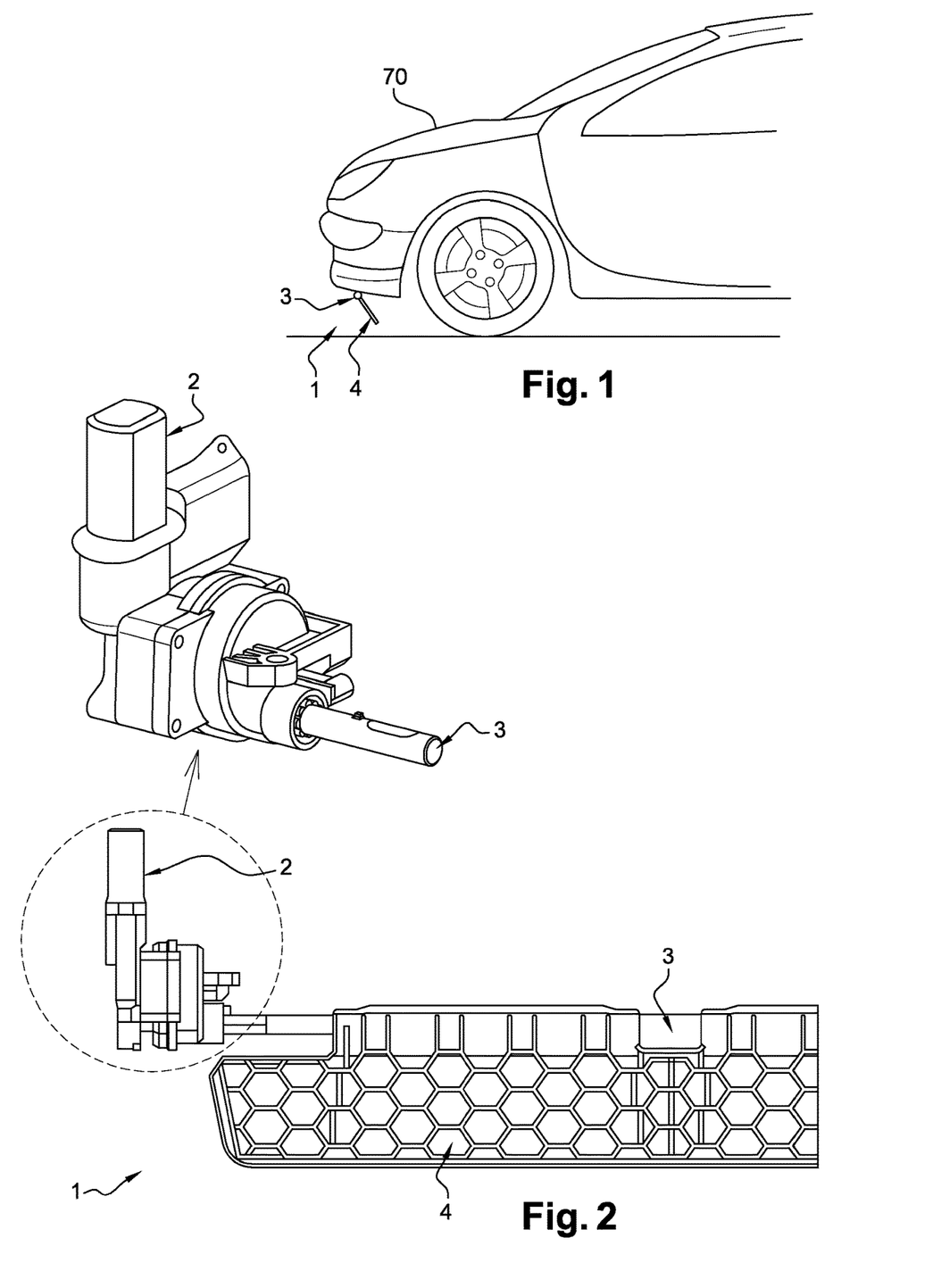
FIG. 1 is a diagram illustrating the positioning of a retractable aerodynamic system with respect to a front portion of a vehicle.
FIG. 2 is a diagram illustrating half of a rotation axis of a retractable aerodynamic system for a motor vehicle.

FIG. 1 shows a front portion of a motor vehicle 70 under which an aerodynamic system 1 according to the invention is positioned, comprising a rotation shaft 3 and a retractable aerodynamic flap 4 locked in the open position.

FIG. 2 shows a portion of a retractable aerodynamic system 1 for a motor vehicle comprising a motor 2, a shaft 3 rotated by the motor 2 and carrying the retractable aerodynamic flap 4. The aerodynamic flap 4 is pivotally mounted between a folded position under the structure of the vehicle 7 (shown on FIG. 7) and an unfolded position in which the flap 4 projects downwards.

Figure 3:
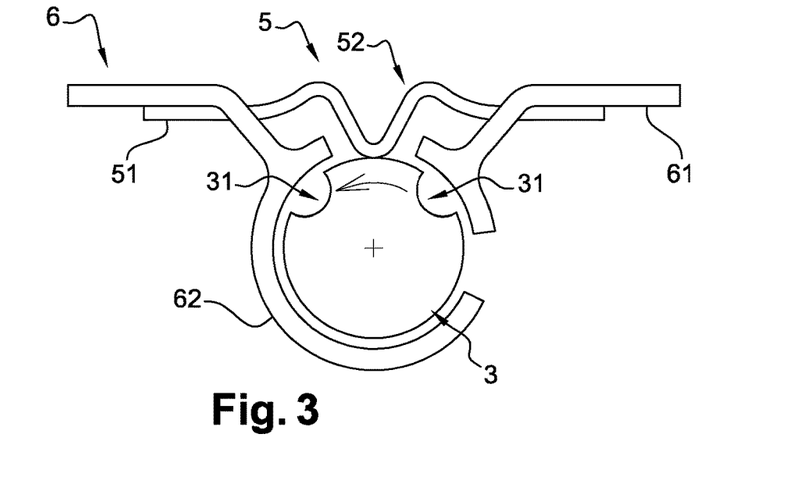
FIG. 3 is a diagrammatic cross-section of the rotation axis of the system when the system is not locked in an indexed position.
Figure 4:
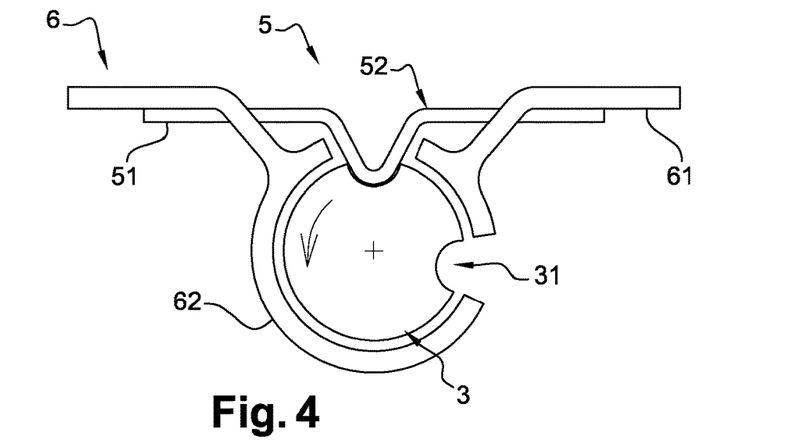
FIG. 4 is a diagrammatic cross-section of the rotation axis of the system when the system is locked in an indexed position.
Figure 6:
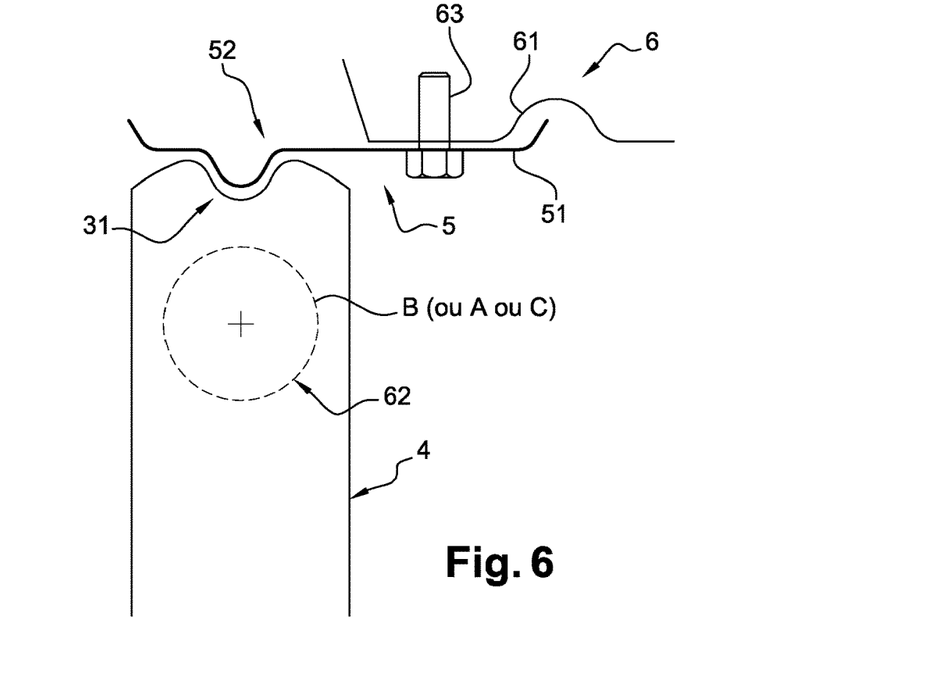
FIG. 6 is a diagram illustrating an alternative of the system of the invention, in which a housing is located on the aerodynamic flap.

As shown on FIGS. 3, 4 and 6, the system 1 also comprises a locking member 5 comprising a fixed portion 51, attached to connecting means 6, and a spring element 52. The spring element 52 shown on FIGS. 3 and 4 is arranged to enter without clearance in one of the two housings 31 present on the shaft 3 during its rotation. Each of the two housings 31 corresponds to an indexed position of the system 1. Each position indicates an inclination of the aerodynamic flap 4, according to a predetermined angle. The spring element 52 of FIG. 6 is arranged to enter without clearance in the housing 31 present on the flap 4 near the shaft, such a configuration allowing a smaller angular displacement of the spring element to engage it in and disengage it from the housing. When only two indexed positions are planned, one of them indicates the position in which the flap 4 provides the best aerodynamic performance, this position and its associated inclination angle being specific to each type of vehicle. The second indexed position is a folded position in which the aerodynamic flap 4 is subjected to virtually no drag. These two positions must be maintained when the vehicle 70 is used, without switching on the motor 2.

In the embodiments shown on FIGS. 3, 4 and 6, the system 1 comprises only housings 31 which comprise concave cavities of identical depths. In an alternative embodiment of the invention, not shown, there may be more housings 31, of different depths and shapes and located on the shaft 3 or on the flap 4, or both on the shaft 3 and the flap 4. They may also be distributed over the length of the rotation axis of the system 1, so that each one accommodates a different spring element 52, these spring elements 52 also being arranged along the shaft 3 and the flap 4.

Figure 5:
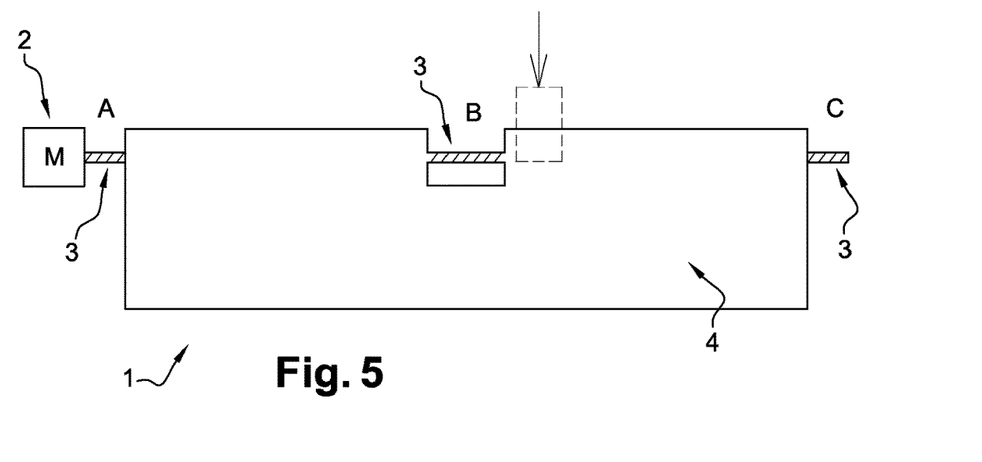
FIG. 5 is a diagram illustrating an embodiment of a portion of the retractable aerodynamic system of the invention.

The housing 31 located on the shaft 3 may be distributed in different areas A, B and/or C of the shaft 3, as shown on FIG. 5. Each area is of particular interest for the positioning of these housings 31. The area A of the shaft 3 is the area closest to the motor 2. Consequently, the motor 2 needs to exert less torque to separate the spring element 52 and the housing 31. The area B corresponds to the centre of thrust of the flap 4. Consequently, the positioning of a locking point in this area offers an advantage regarding the torsional forces experienced by the flap 4, these forces possibly being distributed more regularly along the entire flap 4. Thus, the flap 4 can be designed to be less rigid. Lastly, the area C is the area farthest away from the motor 2 in this specific configuration of the system 1 of the invention. The advantage of positioning a locking point in this area is the optimum damping of the forces experienced by the flap 4, and optionally the possibility of pre-stressing the flap 4 using the motor 2 to make it less deformable. Thus, the locking member 5 and the drive means 2 can contribute to withstanding the aerodynamic forces.

The connecting means 6 comprises a portion 61 attached to the structure of the vehicle 7 and a hollow accommodation portion 62, for example of cylindrical shape, arranged to accommodate the rotating portion of the system 1, formed by the shaft 3 and/or the flap 4 while allowing this portion to rotate. The portion 62 for accommodating the connecting means 6 may also be called a rotation ring 62, since it supports the rotating portion of the system 1 and is intended to limit friction. Thus, the connecting means 6 transmit the forces received from the locking member 5 to the structure of the vehicle 7, while damping some of these forces.

Figure 7:
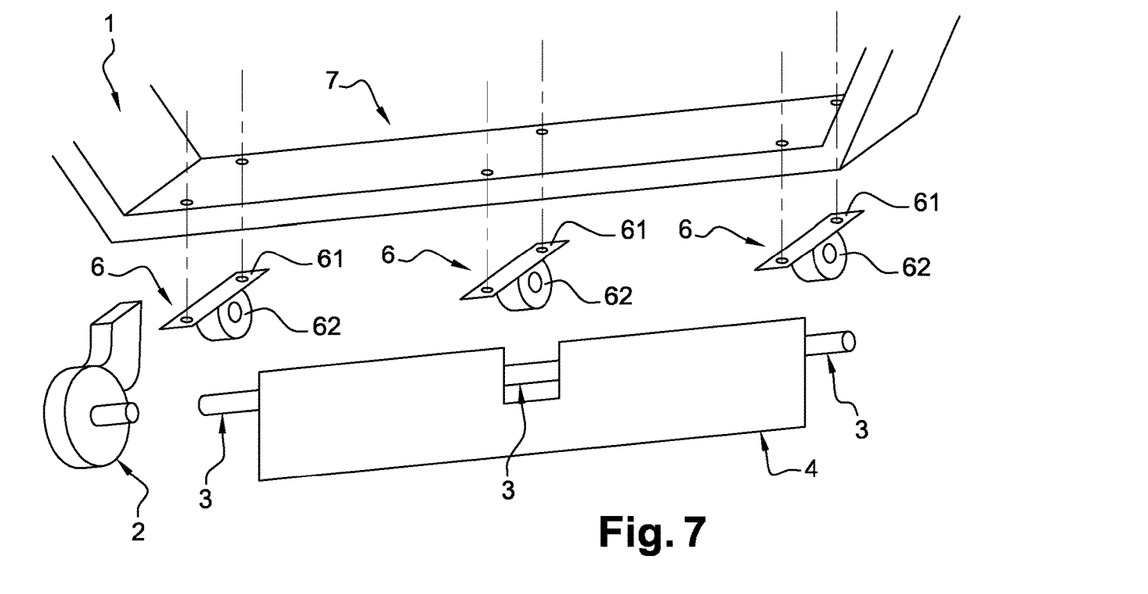
FIG. 7 is a diagram illustrating an exploded view of the retractable aerodynamic system of FIG. 5 with respect to a portion of the structure of the vehicle.

FIG. 7 shows one way in which the connecting means 6 can be attached to the structure of the vehicle 7. For reasons of clarity, the locking member 5 has deliberately not been shown on this FIG. 7. An example of a positive connection between the rigid portion 52 of the locking member 5 and the connecting means 6 is shown on FIG. 6. This connection is obtained using a screw 63 which secures the rigid portion 51 and the portion 61 of the connecting means 6.

The assembly consisting of the locking member 5, the shaft 3, and/or the connecting means 6 can be made of materials having a low coefficient of friction (about 0.1). Such materials can be stainless steel, treated steel or low-friction plastic.

The system 1 of the invention operates as follows.

When the vehicle speed increases, the motor 2 is switched on to rotate the shaft 3 in order to pivot the flap 4 from a folded position to the open position. When the shaft 3 rotates, the spring element 52 of the locking member 5 is compressed and is in contact with the outer portion of the shaft 3, as shown on FIG. 3, or with the outer portion of the flap 4, as shown on FIG. 6. Due to the selected materials, the frictional forces between the spring element 52 and the shaft 3 or the flap, as well as the frictional forces between the portion 62 for accommodating the connecting means 6 and the shaft 3 are very low, even zero and have no negative impact on the motor 2 and its components.

Once the spring element 52 reaches the housing 31, corresponding to the open position, it enters without clearance in the housing 31, due to its convex shape which perfectly matches the concave shape of the housing 31 and forms a locking point, also called "hard point" of the system 1. The motor 2 stops, causing the shaft 3 to stop rotating.

As already mentioned, when the flap 4 is locked in the open position, it is subjected to numerous forces that will be damped by the spring element 52 and transmitted to the connecting means 6 by the assembly of the locking member 5. These forces are then transmitted to the structure of the vehicle 7 by the connecting means 6. Throughout this period, the flap 4 is subjected to aerodynamic forces which are not large enough to risk damaging it. Otherwise, the aerodynamic and/or other forces experienced by the flap 4 are too large to be damped and/or transmitted to the structure of the vehicle 7 and the torque, resulting from these forces, which is applied to the shaft 3 forces the spring element 52 to come out of the housing 31. In the special case of an irreversible type motor 2, the motor 2 may also be activated when the torque applied to the shaft 3, or to the flap 4, forces the spring element 52 to come out, so as to accompany the rotation movement required to reach another indexed position. To do this, the system can be equipped with any means for detecting that the aerodynamic flap 4 leaves its indexed position, such means being, for example, a position sensor. Alternatively, the system 1 may also be equipped with a disengagement member for disengaging the connection between the motor 2 and the rotating portion of the system 1. Thus, the step mentioned above of switching on the motor 2 again is not required.

The open position of the flap 4 can also be unlocked by the motor 2 itself, when the vehicle slows down. There is therefore no longer any need for the flap 4 to be unfolded. Consequently, the motor 2 is switched on so as to exert a torque greater than the threshold planned to make the spring element 52 come out. The motor 2 can then rotate the shaft 3 with a reduced torque, compared with the torque required to make the spring element 52 come out of the housing 31, until the spring element 52 meets the second housing 31, corresponding to the folded position of the flap 4. The torque is in fact reduced since the motor 2 exerts a force on poorly deformable elements before starting the locking, which is not the case if it is positioned in area B or C.

In an embodiment not shown, the flap can also move from the open position to a second folded position, different from the initial folded position. The housing used to position the flap in this second folded position can be positioned so that in order to index this second folded position, there is no need to change the direction of rotation of the shaft initially used to move from the initial folded position to the open position. Such an alternative may be advantageous when excessive forces are applied on the flap in a direction opposite to the direction of rotation required to return to the initial folded position. Such an approach therefore allows the flap to be inclined in a second folded position, in which the flap is less subjected to aerodynamic stresses, without it being necessary for the motor to rotate the flap in the direction opposite to the direction of the forces which are applied on the flap. By constantly repeating such a rotation in the opposite direction, there is a risk of accelerating the wear of the motor and its components, especially due to the high torque which must be implemented to produce such rotation.

The invention claimed is:

1. A retractable aerodynamic system for a motor vehicle comprising a structure of the vehicle, wherein the system comprises at least one aerodynamic flap, a drive means that can rotate the aerodynamic flap about a rotation axis, and at least one member for locking the aerodynamic flap in at least one indexed position with respect to the structure of the vehicle, the locking member being able to transmit forces experienced by the aerodynamic flap to the structure of the vehicle when the aerodynamic flap is locked in one of the at least one indexed positions, the locking member comprising at least one assembly consisting of a spring element and a housing arranged to accommodate at least a portion of the spring element, the housing and the spring element being arranged to be assembled to one another with little clearance.

2. The system according to claim 1, wherein the locking member is able to transmit the forces experienced to lock the aerodynamic flap without any force exerted by the drive means.

3. The system according to claim 1, wherein the housing and the spring element are arranged to be assembled to one another with less clearance than all other clearances present in the rest of the system.

4. The system according to claim 1, wherein the housing comprises a cavity.

5. The system according to claim 4, wherein the housing has a concave shape with a depth of 2 to 5 mm.

6. The system according to claim 1, wherein the spring element is arranged to disengage from the housing when a torque exerted about the rotation axis is greater than a predetermined threshold.

7. The system according to claim 6, wherein the predetermined threshold is 50% of the maximum forces experienced by the aerodynamic flap when driving.

8. The system according to claim 1, further comprising a disengagement member for disengaging a connection between the drive means and the aerodynamic flap.

9. The system according to claim 1, wherein the housing of the locking member's at least one assembly is located on the aerodynamic flap.

10. The system according to claim 1, wherein the housing of the locking member's at least one assembly is located far away from the drive means.

11. The system according to claim 10, wherein the housing of the locking member's at least one assembly is located near a centre of thrust of the aerodynamic flap.

12. The system according to claim 1, wherein the housing of the locking member's at least one assembly is located near the drive means.

13. The system according to claim 1, comprising at least two housings comprising cavities having different depths.

14. The system according to claim 1, comprising at least two housings arranged in the system in order to lock the same one of the at least one indexed positions.

15. The system according to claim 1, comprising means for connecting the aerodynamic flap to the structure of the vehicle, the connecting means being arranged to allow the aerodynamic flap to rotate about the rotation axis in which the spring element is attached to the connecting means.

16. The system according to claim 15, wherein the locking member, the rotation axis, and the connecting means are made of stainless steel, treated steel or low-friction plastic.

17. The system according to claim 1, wherein one of the at least one indexed positions of the aerodynamic flap is a position in which the aerodynamic flap makes an angle of at least 40° relative to the aerodynamic flap in a closed position.

18. The system according to claim 17, wherein one of the at least one indexed positions of the aerodynamic flap is a position in which the aerodynamic flap makes an angle between 40° and 90° relative to the aerodynamic flap in the closed position.

19. The system according to claim 1, wherein the housing and the spring element are arranged to be assembled to one another with zero clearance.

* * * * *

UNITED STATES PATENT AND TRADEMARK OFFICE
CERTIFICATE OF CORRECTION

| | | |
|---|---|---|
| PATENT NO. | : 10,946,909 B2 | Page 1 of 1 |
| APPLICATION NO. | : 16/473159 | |
| DATED | : March 16, 2021 | |
| INVENTOR(S) | : Gérald Andre | |

It is certified that error appears in the above-identified patent and that said Letters Patent is hereby corrected as shown below:

On the Title Page

Item (71), Line 1:
Compagnie Plastic Omnium, Lyons
Should be changed to:
-- Compagnie Plastic Omnium, Lyon --

Item (73), Line 1:
Compagnie Plastic Omnium, Lyons
Should be changed to:
-- Compagnie Plastic Omnium, Lyon --

Item (22), Line 1:
PCT Filed: Nov. 15, 2017
Should be changed to:
-- PCT Filed: Dec. 15, 2017 --

Signed and Sealed this
Twentieth Day of April, 2021

Drew Hirshfeld
*Performing the Functions and Duties of the
Under Secretary of Commerce for Intellectual Property and
Director of the United States Patent and Trademark Office*